United States Patent [19]

Satani et al.

[11] Patent Number: 4,659,581
[45] Date of Patent: Apr. 21, 1987

[54] METHOD OF PRODUCING GRANULAR CHEMICAL SEASONING OF HIGH SPECIFIC VOLUME AND PRODUCT

[75] Inventors: Eiji Satani; Nagaoki Okamoto, both of Osaka, Japan; James G. Fritz, Scotchplains, N.J.; Hiroshi Kimura, New York, N.Y.

[73] Assignee: Takeda Chemical Industries, Ltd., Osaka, Japan

[21] Appl. No.: 788,109

[22] Filed: Oct. 17, 1985

Related U.S. Application Data

[63] Continuation of Ser. No. 505,834, Jun. 20, 1983, abandoned, which is a continuation of Ser. No. 302,526, Sep. 16, 1981, abandoned.

[51] Int. Cl.$^4$ .................... A23L 1/228; A23L 1/229
[52] U.S. Cl. .................... 426/537; 426/650; 426/470
[58] Field of Search ............... 426/470, 536, 650, 537

[56] References Cited

U.S. PATENT DOCUMENTS

| | | | |
|---|---|---|---|
| 2,981,629 | 4/1961 | Ginnette et al. | 426/470 |
| 3,821,436 | 6/1974 | Fry | 426/470 X |
| 4,258,072 | 3/1981 | Eguchi et al. | 426/537 |

OTHER PUBLICATIONS

Spicer, Advances in Preconcentration and Dehydration of Foods, 1974, John Wiley & Sons: New York, pp. 451-452.

*Primary Examiner*—Joseph Golian
*Attorney, Agent, or Firm*—Steifel, Gross, Kurland & Pavane

[57] ABSTRACT

A granular seasoning, which comprises substantially monosodium glutamate and a water-soluble salt of 5'-ribonucleotide and has a high specific volume of about 3.5 to 6 cm$^3$/g, is convenient in scaling with a reduced tendency of scattering and dust formation as well as satisfactory solubility in water. A granular chemical seasoning having a high specific volume is obtained by foam-mat drying an aqueous solution of a material chemical seasoning containing a thickening agent and a foaming agent which has a viscosity of about 8,000 to 25,000, and then disintegrating.

17 Claims, No Drawings

METHOD OF PRODUCING GRANULAR CHEMICAL SEASONING OF HIGH SPECIFIC VOLUME AND PRODUCT

This is a continuation of U.S. application Ser. No. 505,834, filed June 20, 1983, now abandoned, which is a continuation of U.S. application Ser. No. 302,526, filed Sept. 16, 1981, now abandoned.

This invention relates to a granular seasoning, a chemical seasoning composition and a method of producing a granular chemical seasoning of a high specific volume.

Chemical seasonings are available in various forms such as powders, granules, crystals, cubes, pastes and liquids and the degree of meeting the necessary requirements of a chemical seasoning, e.g. measurability, convenience in use, solubility, shelf-life, taste, etc., varies with the forms. Particularly in connection with use in small amount, a chemical seasoning with good measurability and convenience in use, if made available, should prove very convenient not only in home cooking but also in food industries using such a seasoning as one of raw materials. The chemical seasonings available to this day are not satisfactory in the above respects. To overcome the problems, it seems appropriate to increase the specific volume of the seasoning. There may be contemplated various procedures for accomplishing the objective. For example, a crushing process for dividing the seasoning into fine powders, a drying process for producing a finely divided chemical seasoning, and a granulation process for increasing the apparent volume of the seasoning may be mentioned. However, the finer the seasoning is divided, the greater is the ease with which the powder is scattered and presents problems with a static electrical charge.

On the other hand, granulation seems to be a suitable procedure for obtaining said desired seasoning but the conventional granulating method is of limited value in the production of many chemical seasonings.

Therefore, the present inventors studied various methods for increasing the apparent volume of chemical seasonings and found that the foam-mat drying system would be suitable for the purpose. The foam-mat drying system was developed by A. I. Morgan Jr. [U.S. Pat. No. 2,934,441] and has been applied to the drying of apple, orange or other fruit juices, pulps, cake mixes, etc. The principle of this drying system is as follows. A material liquid prepared to a suitable concentration, if necessary, with the addition of a foaming agent, a gas (air or nitrogen gas) is injected into it to produce foams. The foams are laid in a 3 mm (approx.)-thick layer on an endless belt and cratered by blowing air from under the belt. The foamed material is then dried. The drying time is usually as short as about 10 to 15 minutes and there is no excessive temperature increase of the drying load itself, with the result that the flavor of the material is maintained well. Moreover, the dried product contains a large number of air cells and, therefore, is well reconstitutable. However, chemical seasonings even in high concentration do not afford a sufficiently high viscosity, and even if a foaming agent is added, fail to give stable foams. Thus, chemical seasonings cannot be easily foam-mat dried.

In view of the above background, the present inventors have sought for a method of producing a granular chemical seasoning having a high specific volume and a satisfactory solubility. The research led to a finding that the above desired granular seasoning can be successfully produced by adding a thickening agent and a foaming agent to an aqueous material chemical seasoning and foam-mat drying the resulting composition. This invention is predicated on the above finding.

This invention is accordingly directed to (1) a granular seasoning which comprises substantially monosodium glutamate and a water-soluble salt of 5'-ribonucleotide and has a specific volume of about 3.5 to 6 $cm^3/g$, (2) a chemical seasoning composition comprising a material chemical seasoning and, based on the solid content of said seasoning, about 0.5 to 8 weight percent of a thickening agent and about 0.25 to 2 weight percent of a foaming agent and (3) a method of producing a granular chemical seasoning having a high specific volume which comprises adjusting an aqueous solution of a material chemical seasoning to a viscosity of about 8,000 to 25,000 centipoises with a thickening agent, adding about 0.25 to 2 weight percent of a foaming agent, foam-mat drying the resulting composition and disintegrating the dried composition.

As the water-soluble salt of 5'-ribonucleotide, there are mentioned sodium 5'-inosinate, potassium 5'-inosinate, sodium 5'-guanylate and potassium 5'-guanylate, and sodium 5'-inosinate, sodium 5'-guanylate or a 50:50 (approx.) (weight) mixture of sodium 5'-inosinate and 5'-guanylate is preferable.

The term "chemical seasoning" is used herein to denote monosodium glutamate, nucleotide seasonings (e.g. sodium 5'-inosinate, potassium 5'-inosinate, sodium 5'-guanylate, potasium 5'-guanylate, etc.) and mixture of such seasonings.

Preferred examples of such mixtures are mixtures of about 88 to 99 weight parts of monosodium glutamate with about 12 to 1 weight parts of the water-soluble salt of 5'-ribonucleotide, and said water soluble salt of 5'-ribonucleotide is preferably sodium 5'-inosinate, sodium 5'-guanylate or a 50:50 (approx.)(weight) mixture of sodium 5'-inosinate and sodium 5'-guanylate.

In the production of the granular chemical seasoning having a high specific volume according to this invention there may be added suitable amounts of such auxiliary agents as acids (e.g. citric acid, tartaric acid, etc.), coloring matter (e.g. β-carotene, caramel, etc.) and nourishment fortifiers (e.g. vitamins, minerals, etc.).

The thickening agent employed in the practice of this invention includes such natural gums as plant seed gums (e.g. guar, locust bean), plant exudates (e.g. tragacanth, karaya) and microbial fermentation gums (e.g. xanthane), and such semi-synthetic gums as sodium alginate and carboxymethyl-cellulose. Mixtures of said thickening agent may be employed. According to the kinds of the chemical seasoning and other factors, one or more than one such thickening agents are selected and used. Particularly desirable, however, is the concomitant use of guar gum and sodium alginate.

The level of addition of the thickening agent depends on the type and concentration of the material chemical seasoning but it is preferable to employ thickening agents which will give high viscosities at the lowest possible level of addition.

Usually an aqueous solution of the material chemical seasoning is prepared with a sufficient amount of the thickening agent to give a viscosity of about 8,000 to 25,000 centipoises. The amount of the thickening agent added for the preparation of the aqueous solution is about 0.5 to 8 weight percent, preferably about 1 to 4 weight percent, based on the weight of the solid content of the solution.

The above viscosities are those measured with Brookfield Viscometer (Brookfield Engineering Laboratories Incorporated, U.S.A.) at 30 r.p.m. at 25° C.

The method of addition of the thickening agent is not critical and may be the same as that used conventionally in the dissolution of the thickening agents in aqueous systems. For Example, the thickening agent is first dispersed in water and dissolved by heating and, then, the material chemical seasoning is gradually added and dissolved. When the thickening agent does not disperse well, it is first admixed with the seasoning in particulate form and, then, the mixture is dispersed and dissolved in water.

The foaming agent employed in accordance with this invention is exemplified by glycerin fatty acid esters (monoglycerides, mainly stearic acid monoester), sucrose fatty acid esters (e.g. those based on lauric acid ester, stearic acid ester, palmitic acid ester or oleic acid ester), lecithin, foaming proteins (e.g. egg white, soybean albumin, soybean protein hydrolysate, etc.) and so on.

The level of addition of the foaming agent is about 0.25 to 2 weight percent of the solid content of the material chemical seasoning.

The method of addition of the foaming agent is not particularly critical and may be the conventional method. Thus, for example, the foaming agent is added in portions with constant stirring.

Following the above addition of the foaming agent, the foaming of the material seasoning is effected by a suitable method, e.g. by vigorous stirring with air injected into the seasoning solution. The foamed material is then foam-mat dried.

For example, the foamed material is placed in a 3 mm (approx.)-thick layer on an endless belt and cratered by blowing air from under the belt, followed by drying with a hot current of air. The drying process consists of three stages and the first, second and third stages of drying are carried out at the temperatures of about 130° C., about 120° C. and about 60° C., respectively.

The above method affords a chemical seasoning composition comprising said material chemical seasoning and, based on the solid content of the chemical seasoning, about 0.5 to 8 weight percent of a thickening agent and about 0.25 to 2 weight percent of a foaming agent. This composition is disintegrated by the following procedure.

Thus, the above dried chemical seasoning composition is scraped off and transferred to a disintegrating stage. The disintegrating machine may be an optional type of machine such as Power Mill (SHOWA KAGAKU KIKAI CO. LTD., Japan), Atomizer (Fuji Paudal Co. Ltd., Japan), Fitz Mill (HOSOKAWA MICRON CORPORATION, Japan) or Granulator (NIPPON GRANULATOR CO. LTD., Japan). The granulation is desirably performed in such a manner that the final granular product has a grain size to pass a 12 mesh screen and a specific volume of about 3.5 to 6 cm$^3$/g or more. To meet these requirements, to prevent formation of fine dusts, and to ensure a uniform grain size distribution, it is preferable to employ a granulator.

In the present specification, the term "mesh" means the mesh size of Tyler standard sieves (U.S.A.). The grain size of 12 mesh pass is that grains pass a 12-mesh screen.

The chemical seasoning having a high specific volume and the granular chemical seasoning thus obtained are also included in "chemical seasoning composition" of the present invention.

The resulting granular chemical seasoning having a high specific volume is convenient in scaling because of its high specific volume, with a reduced tendency of scattering and dust formation, and is as well soluble in water as the material chemical seasoning.

Furthermore, the present granular chemical seasoning of a high specific volume has another advantage as follows.

The chemical seasoning having high specific volume allows for more precise scaling, thus avoiding excessive amounts of sodium being added to foods. The fear with present material chemical seasonings is that they may be added to foods excessively due to erroneous scaling and when such material chemical seasonings is in the form of sodium salt, excessive amounts of sodium could be added to foods.

The following examples are given to illustrate the present invention in further detail without limiting its scope.

EXAMPLE 1

In Micro Speed Mixer (TAKARA KOKI CO. LTD., Japan), 470 g of guar gum, 470 of sodium alginate and 4.7 kg of monosodium glutamate are blended. The resulting blend is dispersed in 34.2 kg of water at 35° C. and the dispersion is heated at 70° C. to give a homogeneous solution. Then, 16 kg of monosodium glutamate is added gradually in portions with stirring and dissolved. Then, 1.8 kg of sodium 5'-ribonucleotide[a 50:50 (weight) mixture of sodium 5'-inosinate and sodium 5'-guanylate] is added gradually under stirring and dissolved. The viscosity of this solution of chemical seasoning is about 21,000 centipoises (Brookfield Viscometer, 25° C.). To 3 kg of water is added 350 g of glycerin fatty acid ester (EMALUSY-MS, Riken Vitamin Co. Ltd., Japan) and the mixture is heated to 70° C. and added to the above seasoning solution. The mixture is admixed well and dried in foam-mat.

First, with air injected into the above seasoning solution, the solution is foamed with a foaming machine. The density of the resulting foam is 0.55 g/cm$^3$. The foamed material is laid in a 3 mm-thick layer on a perforated belt and cratered by blowing air from under the belt. There ensues a drying process. Thus, the drying temperatures are 130° C., 120° C. and 60° C. at the first, second and third stages, respectively, and the total drying time is 20 minutes. The dried seasoning is scraped off and pulverized in Granulator (NIPPON GRANULATOR CO. LTD., Japan) to give granules of 12 mesh pass and having a specific volume of 5.0 cm$^3$/g. The resulting product has fine and uniformly distributed air cells and shows a satisfactory solubility in water.

The specific volume of the control granules produced from the same composition with an extruding granulator and the specific volume of the granules according to this invention are shown in Table 1.

The above control granules are the granules produced in the following manner.

Monosodium glutamate is pulverized in Atomizer (Fuji Paudal Co. Ltd., Japan) using a 80-mesh screen. In Micro Speed Mixer (TAKARA KOKI CO. LTD., Japan), 46 kg of the finely divided monosodium glutamate and 4 kg of sodium 5'-ribonucleotide (a 50:50 mixture of sodium 5'-inosinate and sodium 5'-guanylate) are blended and further admixed with gradual addition of 4 kg of water. The resulting aqueous mixture is first preliminarily granulated with an extruding granulator equipped with a 10 mm-screen and, then, further granulated with a 12-mesh screen. The granules are then dried in Fluid Bed Dryer (Fuji Paudal Co. Ltd., Japan) at 90° C. for 40 minutes to give a granular chemical seasoning.

TABLE 1

| Sample | Specific volume ($cm^3/g$) |
| --- | --- |
| Extruding-granulated product | 1.6 |
| Granular product of this invention | 5.0 |

It will be apparent from the above table that the method of this invention affords a granular chemical seasoning having a very high specific volume.

EXAMPLE 2

In Micro Speed Mixer (TAKARA KOKI Co. LTD., Japan), 250 g of locust beam gum, 500 g of sodium alginate and 4.25 kg of monosodium glutamate are blended. This mixture is dispersed in 34.5 kg of water at 35° C. and heated at 80° C. until it is completely dissolved. The viscosity of the seasoning solution at this stage is 10,000 centipoises (Brookfield Viscometer, 25° C.). Separately, 250 g of glycerin fatty acid ester (EMALUSY-MS, Riken Vitamin Oil Co. Ltd.) and 125 g of sucrose fatty acid ester (DK-Ester F-110, Dai-ichi Kogyo Seiyaku Co. Ltd., Japan) are added to 3 kg of water, and the mixture is heated to 70° C. and admixed with the above seasoning solution. The whole mixture is then foam-mat dried.

First, with air constantly injected into the seasoning solution, the solution is foamed with a foaming machine. The density of the foam is 0.59 g/$cm^3$. The foamed material is laid in a 3 mm-thick layer on a perforated belt and cratered by blowing air from under the belt. The material is then dried. The drying temperatures are 130° C., 120° C. and 60° C. at the first, second and third stages, respectively, and the total drying time is 20 minutes. The dried seasoning is scraped off and disintegrated with Granulator (NIPPON GRANULATOR CO. LTD.) to give a 12-mesh-pass granular seasoning with a specific volume of 4.3 $cm^3$/g.

The product obtained above has fine and uniformly distributed air cells and a high specific volume and shows an excellent solubility in water.

EXAMPLE 3

In Micro Speed Mixer (TAKARA KOKI CO. LTD., Japan), 250 g of locust bean gum, 650 g of sodium alginate and 4.5 kg of monosodium glutamate are blended. The resulting blend is dispersed in 32.5 kg of water at 35° C. and the dispersion is heated at 70° C. to give a homogeneous solution. Then, 15.3 kg of monosodium glutamate is added gradually in portions with stirring and dissolved. Then, 2.7 kg of sodium 5'-inosinate is added gradually under stirring and dissolved. The viscosity of this chemical seasoning solution is about 17,500 centipoises (Brookfield Viscometer, 25° C.). To 3 kg of water is added 200 g of glycerin fatty acid ester (EMALUSY-MS, Riken Vitamin Co. Ltd., Japan) and 130 g of sucrose fatty acid ester(DK-Ester F-110, Dai-ichi Kogyo Seiyaku Co. Ltd., Japan) and the mixture is heated to 70° C. and added to the above seasoning solution. The mixture is admixed well and dried in foam-mat.

First, with air injected into the above seasoning solution, the solution is foamed with a foaming machine. The density of the resulting foam is 0.59 g/$cm^3$. The foamed material is laid in a 3 mm-thick layer on a perforated belt and cratered by blowing air from under the belt. There ensues a drying process. Thus, the drying temperatures are 130° C., 120° C. and 60° C. at the first, second and third stages, respectively, and the total drying time is 20 minutes. The dried seasoning is scraped off and pulverized in Granulator (NIPPON GRANULATOR CO. LTD., Japan) to give granules of 12 mesh pass and having a specific volume of 5.3 $cm^3$/g. The resulting product has fine and uniformly distributed air cells and shows a satisfactory solubility in water.

EXAMPLE 4

In Micro Speed Mixer (TAKARA KOKI CO. LTD., Japan), 250 g of guar gum, 500 g of sodium alginate, 100 g of xanthane gum and 4.0 kg of monosodium glutamate are blended. The resulting blend is dispersed in 32 kg of water at 35° C. and the dispersion is heated at 70° C. to give a homogeneous solution. Then, 17.6 kg of monosodium glutamate is added gradually in portions with stirring and dissolved. Then, 900 g of sodium 5'-guanylate is added gradually under stirring and dissolved. The viscosity of this chemical seasoning solution is about 19,300 centipoises (Brookfield Viscometer, 25° C.). To 3 kg of water is added 280 g of glycerin fatty acid ester (EMALUSY-MS, Riken Vitamin Co. Ltd., Japan) and the mixture is heated to 70° C. and added to the above seasoning solution. The mixture is admixed well and dried in foam-mat.

First, with air injected into the above seasoning solution, the solution is foamed with a foaming machine. The density of the resulting foam is 0.57 g/$cm^3$. The foamed material is laid in a 3 mm-thick layer on a perforated belt and cratered by blowing air from under the belt. There ensues a drying process. Thus, the drying temperatures are 130° C., 120° C. and 60° C. at the first, second and third stages, respectively, and the total drying time is 20 minutes. The dried seasoning is scraped off and pulverized in Granulator (NIPPON GRANULATOR CO. LTD., Japan) to give granules of 12 mesh pass and having a specific volume of 5.1 $cm^3$/g. The resulting product has fine and uniformly distributed air cells and shows a satisfactory solubility in water.

What is claimed is:

1. A granular chemical seasoning consisting essentially of a material chemical seasoning consisting essentially of about 88 to 99 parts by weight of monosodium glutamate and about 12 to 1 part by weight of a water-soluble salt of 5'-ribonucleotide, a thickening agent of guar gum and sodium alginate comprising about 0.5 to 8 weight percent of the solid content of said granular chemical seasoning and a foaming agent of glycerine fatty acid ester comprising about 0.25 to 2 weight percent of the solid content of said granular chemical seasoning; said granular chemical seasoning having a specific volume of about 3.5 to 6 $cm^3$/g.

2. A granular seasoning according to claim 1, wherein the water-soluble salt of 5'-ribonucleotide is a mixture of sodium 5'-inosinate and sodium 5'-guanylate.

3. A granular seasoning according to claim 1, wherein the water-soluble salt of 5'-ribonucleotide is sodium 5'-inosinate.

4. A granular seasoning according to claim 1, wherein the water-soluble salt of 5'-ribonucleotide is sodium 5'-guanylate.

5. A granular seasoning according to claim 1, wherein the granular seasoning is of a size to pass 12 mesh screen.

6. A granular seasoning according to claim 2, wherein the mixture of sodium 5'-inosinate and sodium 5'-guanylate is about 50:50 (weight) mixture thereof.

7. A method of producing a granular chemical seasoning having a specific volume of about 3.5 to 6 cm$^3$/g which comprises adjusting an aqueous solution of a material chemical seasoning consisting essentially of about 88 to 99 parts by weight of monosodium glutamate and 12 to 1 part by weight of 5'-ribonucleotide to a viscosity of about 8,000 to 25,000 centipoises with a thickening agent of guar gum and sodium alginate in an amount of 0.5 to 8 weight percent of the solid content of said chemical seasoning, adding a foaming agent of glycerin fatty acid ester in an amount equal to about 0.25 to 2 weight percent of the solid content of said chemical seasoning, foam-mat drying the mixture and disintegrating the same.

8. A method of producing a granular chemical seasoning according to claim 7, wherein the disintegration is carried out to a size to pass a 12 mesh screen.

9. A method of producing a granular chemical seasoning according to claim 7, wherein the material chemical seasoning is monosodium glutamate.

10. The method according to claim 7, wherein the adjusted aqueous solution is prepared by blending the guar gum, sodium alginate and monosodium glutamate, dispersing the resulting blend in a water and mixing under heating, and then adding gradually the 5'-ribonucleotide under stirring.

11. The method according to claim 7, wherein the form-mat drying is conducted by placing about a 3 mm thick layer on an endless belt, craterering said layer by blowing air from under the belt, drying said craterered layer with a hot current of air in three stages, the temperature of said first stage being about 130° C., of said second stage being about 120° C. and said third stage being about 60° C.

12. The method according to claim 2 wherein the disintegration is conducted by use of a granulator.

13. A method of producing a granular chemical seasoning according to claim 7, wherein the material chemical seasoning is a mixture of sodium 5-inosinate and sodium 5'-quanylate.

14. A method of producing a granular chemical seasoning according to claim 13, wherein the water-soluble salt of 5'-ribonucleotide is a mixture of sodium 5'-inosinate and sodium 5'-guanylate.

15. A method of producing a granular chemical seasoning according to claim 13, wherein the water-soluble salt of 5'-ribonucleotide is sodium 5'-inosinate.

16. A method of producing a granular chemical seasoning according to claim 13, wherein the water-soluble salt of 5'-ribonucleotide is sodium 5'-guanylate.

17. A method according to claim 13, wherein the mixture of sodium 5'-inosinate and sodium 5'-guanylate is about 50:50 (weight) mixture thereof.

* * * * *

UNITED STATES PATENT AND TRADEMARK OFFICE
CERTIFICATE OF CORRECTION

PATENT NO. : 4,659,581

DATED : Apr. 21, 1987

INVENTOR(S) : Eiji Satani et al.

It is certified that error appears in the above-identified patent and that said Letters Patent is hereby corrected as shown below:

Column 8, line 12, Claim 12 should depend from Claim 7.

Signed and Sealed this

Nineteenth Day of January, 1988

Attest:

DONALD J. QUIGG

*Attesting Officer*    *Commissioner of Patents and Trademarks*